United States Patent [19]

Kovács

[11] Patent Number: 4,488,077

[45] Date of Patent: Dec. 11, 1984

[54] ASYNCHRONOUS MACHINE WITH STARTING DISC

[75] Inventor: Gábor Kovács, Budapest, Hungary

[73] Assignee: Ganz Villamossagi Müvek, Budapest, Hungary

[21] Appl. No.: 327,170

[22] Filed: Dec. 3, 1981

[30] Foreign Application Priority Data

Dec. 30, 1980 [HU] Hungary ............... 3151/80

[51] Int. Cl.³ .......................................... H02K 17/18
[52] U.S. Cl. ............................. 310/212; 310/166; 310/211
[58] Field of Search ............... 310/182, 183, 125, 52, 310/58, 60 R, 41, 168, 172, 190, 166, 210–212, 163, 256, 261

[56] References Cited

U.S. PATENT DOCUMENTS

| 1,823,337 | 9/1931 | Sheely | 310/212 |
| 1,848,511 | 3/1932 | Adamcikas et al. | 310/58 |
| 2,242,339 | 5/1941 | Baudry | 310/211 |
| 2,394,517 | 2/1946 | Ingalls | 310/60 R |
| 3,335,308 | 8/1967 | Robinson | 310/211 |
| 3,902,087 | 8/1975 | Hakamada et al. | 310/211 |

FOREIGN PATENT DOCUMENTS

| 1015122 | 9/1957 | Fed. Rep. of Germany | 310/211 |
| 704555 | 2/1954 | United Kingdom | 310/211 |

Primary Examiner—J. D. Miller
Assistant Examiner—D. L. Rebsch
Attorney, Agent, or Firm—Murray Schaffer

[57] ABSTRACT

An asynchronous electric machine, having an iron core mounted on a shaft, squirrel bars and a short circuit ring connecting the bars at both ends of the rotor, and a stator having a coil winding provided with end turns exterior of the stator. A conductive body made of magnetizable or non-magnetizable material is mounted in the field of the stray magnetic flux pattern formed by the end-turns and the short circuiting ring, to increase losses, and thereby increase starting torque.

9 Claims, 8 Drawing Figures

ASYNCHRONOUS MACHINE WITH STARTING DISC

BACKGROUND OF THE INVENTION

The invention relates to asynchronous motors employing a squirrel-cage rotor.

The starting torque of asynchronous machines is normally determined by the loss arising in the rotor at rest. With machines having a simple short circuit rotor the resistance of the rotor is limited by the permissible operational loss. Taking into consideration that the values of resistance of the rotor are identical both in the course of operation and when starting, the loss arising in the rest condition (and accordingly, the starting torque) are resulting values. This resulting value is called the natural starting torque. The proportion of the natural starting torque to the nominal torque will generally be reduced, to increase the output, so that above an output of 50–200 kW it is not enough to run a working machine, which can be started otherwise easily.

Special measures are to be taken in order to increase the resistance required at starting and thus the loss arising in course of starting, while maintaining the operational resistance at a constant level. For this purpose, in order to provide asynchronous motors with a high output, rotors with double cages or with deep bars are used. In both cases the phenomenon of current displacement is exploited. In the former case the current is unevenly distributed between two cages, while in the latter case uneven distribution may be observed within the bar. Both can be characterized by the fact that the increase of losses at start takes place within the iron core of the rotor. Both solutions require a larger conductive cross-section, so that the space requirement is also larger than would normally be required by the cage of the simple short circuited rotor. Since the increased space is required precisely in the magnetically active part of the machine, this involves not only the increase in dimension of the active parts, but also an increase in the general dimensions of the machine.

It has been attempted to increase the losses at start by means of the stray flux of the bars of the rotor or of the short circuit ring. Such a solution has been described e.g. in the German Patent DE-PS No. 870 449. With this solution an iron ring has been arranged beneath the short circuit ring in such a manner that there is contact between the two rings. The aim of the arrangement has been to increase considerably the uneven current distribution arising in the short circuit ring during start and to increase the losses in such a manner. The increase of the uneven current distribution has certain limits, and in addition, it involves a considerable danger, since the associated uneven heating results in a damaging thermal dilatation and may lead to the melting of the solder holding the bar and the ring.

Due to the complicated structural formation or the insufficient resulting loss, these solutions have not seen wide use. The qualitative pattern of the stray flux lines —and even to a lesser extent the quantitative relationships have not been duly found. In addition, the influence of the coil-head or end turn of the stator winding has been absolutely disregarded.

The aim of the invention is to develop a solution, with which the added losses required for increasing the starting torque do not arise within the iron core, but in the field of the end turns, which has a simple construction and can be produced at lower cost.

SUMMARY OF THE INVENTION

The invention relates to any asynchronous machine and any optionally formed rotor—but preferably with a motor having one squirrel-cage, and which has, in addition to the short circuit ring, one or more conductive bodies of rotation, such as a disc or a ring, made of a magnetizable or a non-magnetizable material.

In the rotor of an asynchronous machine losses will arise at the places, where the rotating magnetic field intersects the stationary conductive media of the rotor. However, the rotating magnetic field is not only present in the iron core, but it exists also outside of the core, along the common path of the stray flux lines of the end turns of the stator and the short circuit ring of the rotor. Taking into consideration that the extension of the end turns of the stator (the axial space requirement) is considerably larger than the extension of the short circuit coils of the rotor (of the squirrel-cage), there exists a space adjacent to the short circuit ring which has, up to now, not been used. According to the present invention, when, in this space, a conductive medium is placed, the common stray flux of the short circuit ring and the end turns cooperate to induce eddy currents, resulting in losses.

The invention is thus based on the recognition that this common stray flux is of considerable magnitude and by the proper selection of the place, dimensions and material of the conductive body considerable losses may be obtained. At last, when a conductive medium is arranged in this space, the mechanical formation of the rotor can be much simpler than it has been up to now. If this conductive medium can be simultaneously magnetized, it will collect the stray flux lines and increase the number thereof. As a consequence, the current displacement—existing anyway in the short circuit ring—will be increased slightly in course of starting, and accordingly, the losses will also increase. In the magnetizable medium, it being a solid body, a considerable loss arises and a part of the stray flux of the end turns of the stator will be converted into a main flux. This means that in the field of the end turns a torque arises (also during operation), similar to that taking place in the iron core. If for structural reasons the ring is not seated directly on the shaft, but on the ribs or supporting brackets, a magnetizable ring may be put under the conductive medium, in order to ensure the path of the stray flux lines needed for inducing the eddy currents, towards the iron core and the ribs and the shaft, respectively.

In a preferred embodiment of the invention the short circuit ring has been radially and deeply cut between the bars so that, in the disc(s) arranged next to it, higher losses could be produced. If the short circuit ring is seated on the ribs, a magnetizable ring is arranged under the short circuit ring and the discs, which may be connected to the iron core.

In a further embodiment, the function of the disc lying farthest from the iron core is taken over by a ventilator. It is possible to arrange one or more conductive, magnetic or non-magnetic discs only on one side of the machine instead of in a symmetrical arrangement.

In a further embodiment, either the discs, which are arranged next to the short circuit ring, or the ring which is arranged under it, can be divided, whereby the function of one single component is taken over by more components serving identical purposes.

BRIEF DESCRIPTION OF THE DRAWINGS

The invention will be described in connection with the several exemplary embodiments with the aid of the accompanying drawings, wherein:

FIG. 7a is a sectional view through the short circuit ring;

FIG. 7b is a side view of the portion of the short circuit ring of FIG. 7a;

FIG. 7c is a sectional view through another form of short circuit ring;

FIG. 7d is a side view of the short circuit ring of FIG. 7c; and

DESCRIPTION OF THE INVENTION

Figure 1:
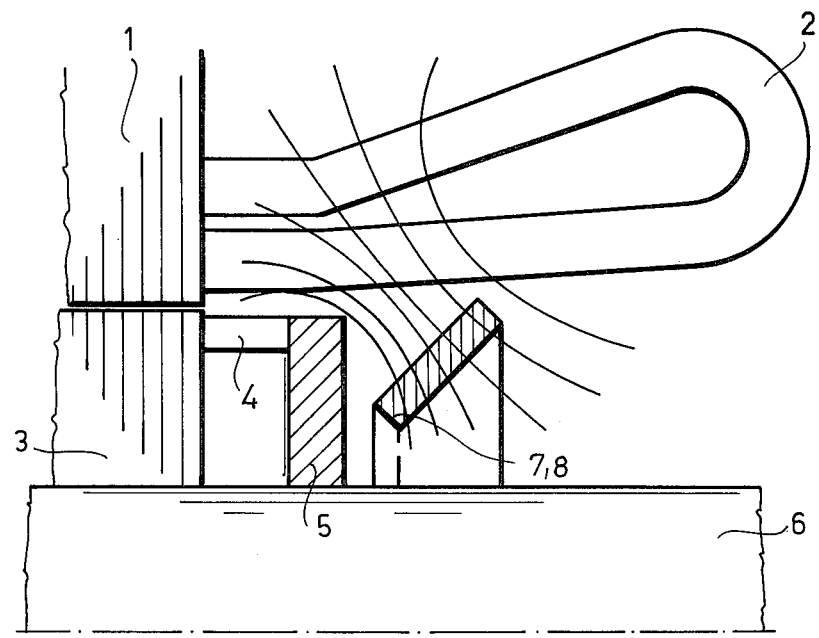
FIG. 1 is a sectional view of one end of a rotor showing generally the placement of a magnetizable or conductive body, according to the present invention.

As seen in FIG. 1, the rotor comprises a stator 1, having an iron core through which a plurality of coils, interconnected by means of end turns 2, pass. The cage-bars 4 in the iron core of the rotor 3 are interconnected by means of a short circuit ring 5. Both the iron core of the rotor 3 and the short circuit ring 5 are seated on a shaft 6. The qualitative patterns of the stray flux lines of the field of the end turns 2 are drawn in the figure. A conductive non-magnetizable body 7 and/or magnetizable body 8 are located in this field. When viewing the qualitative pattern of this field, the ideal arrangement of the conductive body 7 which may be metal, or the magnetizable body 8 which may be iron, in the area of the short circuit ring becomes obvious. In FIG. 1, the fixation of the conductive medium 7 or the magnetizable medium 8 onto the shaft 6 is not illustrated. In the figure, only one single body has been schematically illustrated.

The figures illustrate practical embodiments according to the invention. In the figures—the components 7 and 8 are illustrated as discs. This form may be preferable but they need not be discs. As seen in FIG. 1, the basic idea of the invention can be realized in any machine, not only an asynchronous motor, and of whatever construction. The components 7 and 8, however, should have an annular form or be bodies of rotation about a center.

Figure 2:
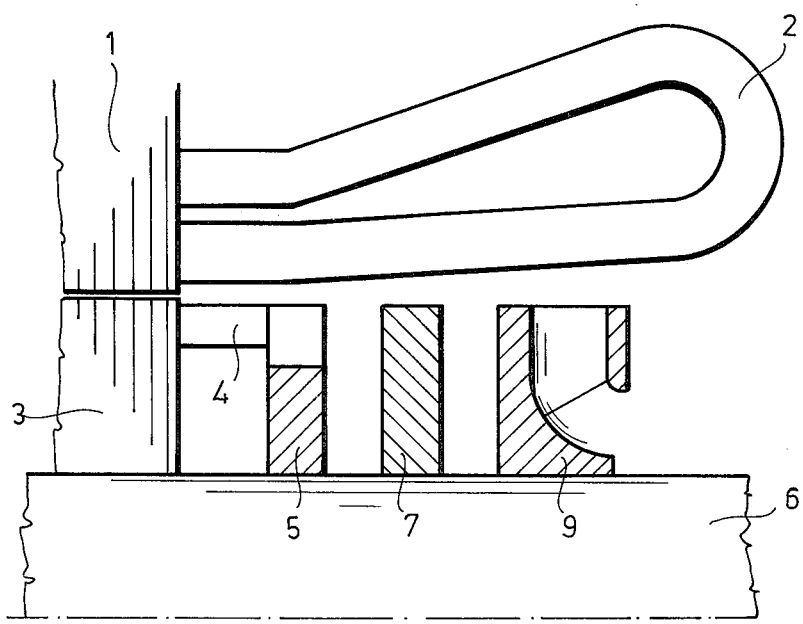
FIG. 2 is a view similar to FIG. 1 showing an embodiment wherein the body is placed on the shaft of the rotor.
Figure 4:
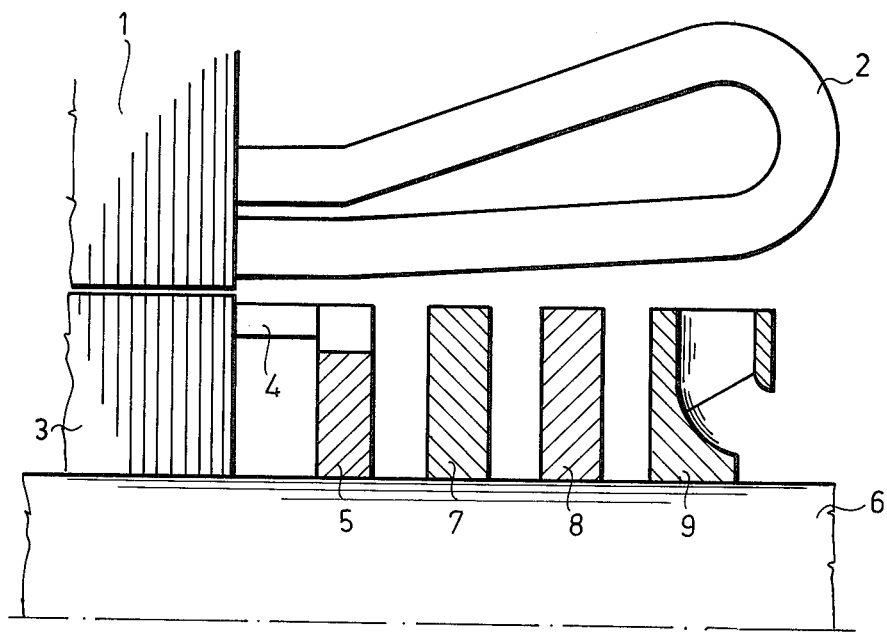
FIG. 4 is a view similar to FIG. 2 showing still another arrangement of bodies on the shaft.

In the embodiments illustrated in FIGS. 2 and 4 various combinations of metal disc 7 and/or iron disc 8 are shown, arranged axially next to the short circuit ring 5. The iron core of the rotor 3, the short circuit ring 5 and the discs 7, 8 are all seated on the shaft 6. A ventilator 9, such as a radial ventilator, ensures the cooling of the machine.

Figure 5:
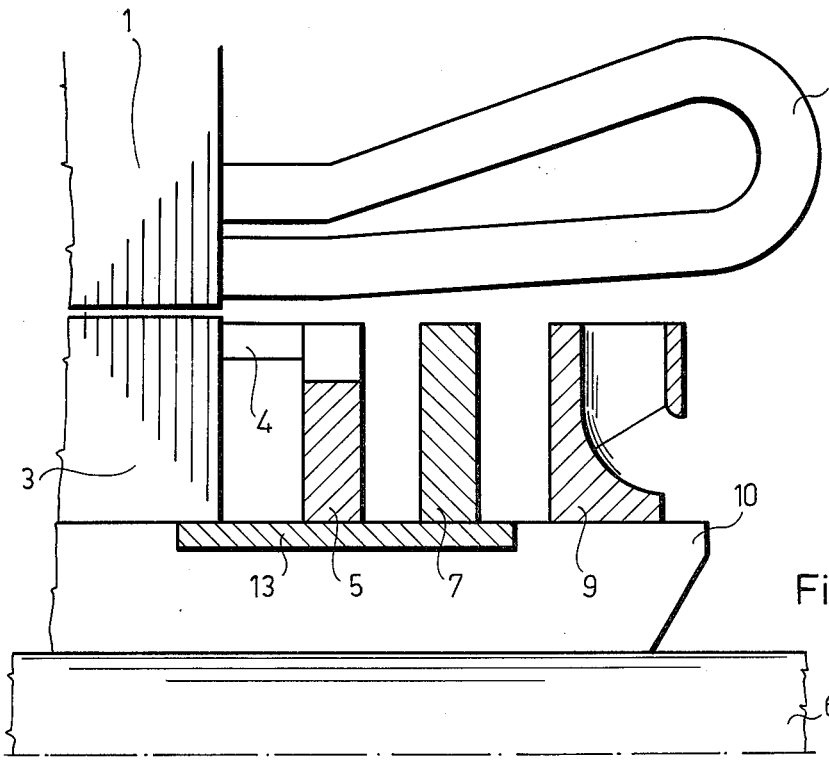
FIG. 5 is a view similar to FIG. 1 showing the bodies supported on brackets.
Figure 6:
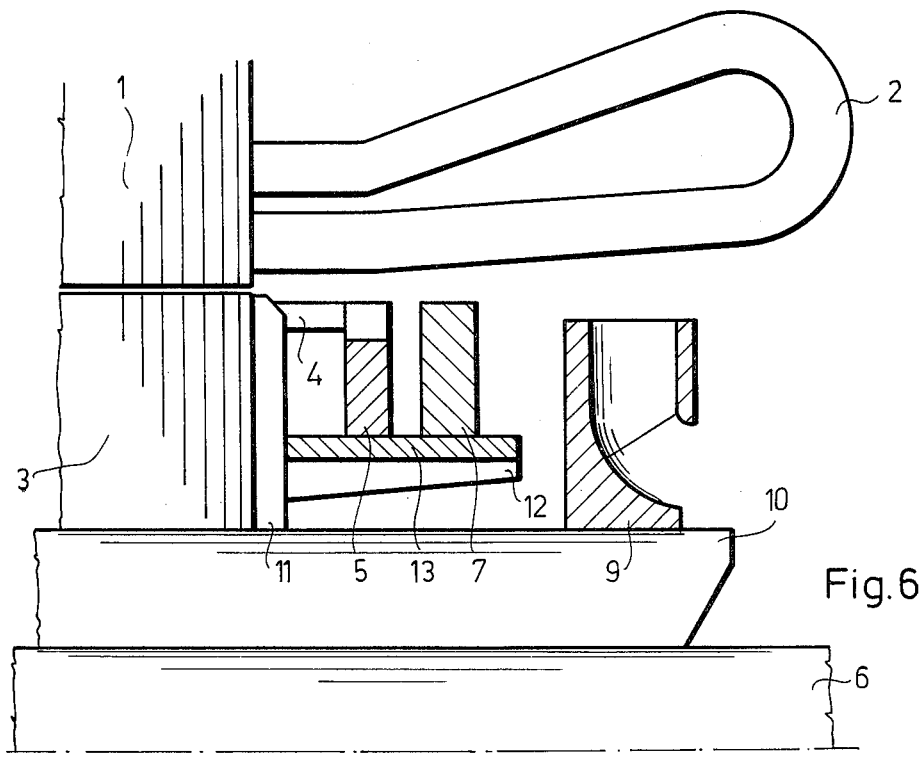
FIG. 6 is a view similar to FIG. 1 showing the bodies supported on ribs.

In FIGS. 5 and 6 an arrangement is shown where the active parts of the rotor are not seated directly on the shaft 6. In the figures the short circuit ring 5 and the metal disc 7 are seated on ribs 10, or on supporting brackets 12 which have been fixed to a clamping disc 11 holding the iron core of the rotor. In this case an iron ring 13 is arranged beneath the short circuit ring and the metal disc 7. As an example, but not necessarily limiting, the iron ring 13 may be connected to the iron core of the rotor. The disc 11 although not shown in FIGS. 1-5, may be used in those embodiments.

In any of the arrangements shown in the figures, in the metal disc 7, the iron disc 8 and the iron ring 13 may be formed with ventilating channels, since such channels will not hinder the expedient course of the magnetic currents and magnetic flux lines.

Figure 7:
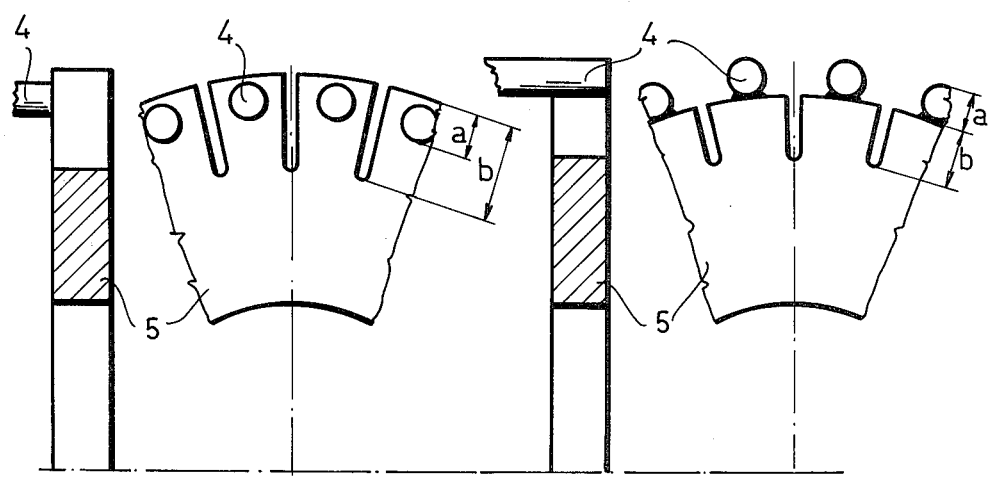

According to the FIG. 7 the short circuit ring 5 and the non-magnetizable body 7 and the magnetizable body 8 have been cut-in radially between the bars 4 to form notches. The notches should be deep. According to the invention, the length b (i.e. the depth of the notch) should be larger than twice the diametric dimension a of the bar 4. The use of a notch is known in itself and it has often been used for technological reasons, e.g. for facilitating the soldering of the bars. However, a notch of such an extent has not been previously used and is needed only for the purpose of the invention; otherwise, it is not required.

Figure 8:
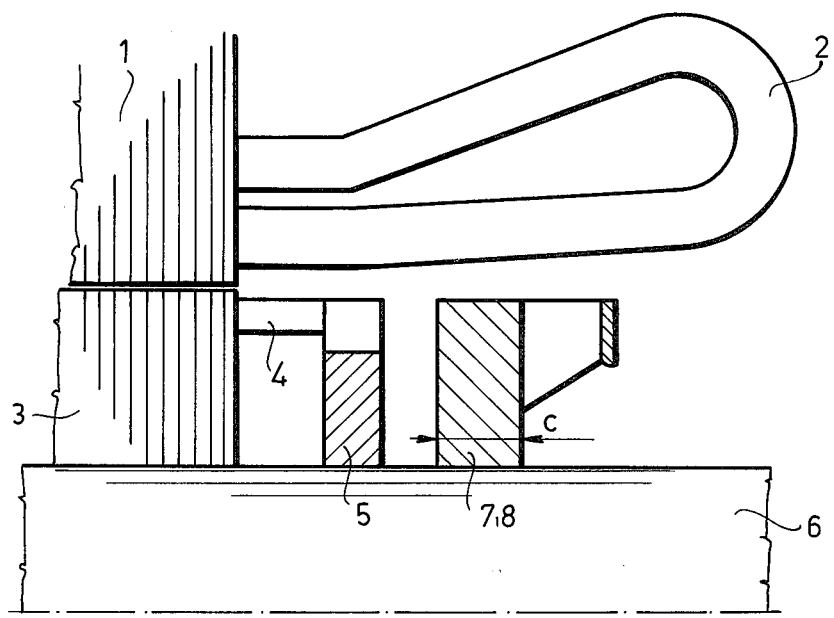
FIG. 8 is a view such as FIG. 1 showing the use of a ventilator.

As it is to be seen in FIG. 8, the disc 7 or 8 (lying the farthest from the iron body) is conveniently formed as a ventilator in lieu of the component 9 serving originally for the purpose of ventilation. The body 7, 8 is re-shaped, in accordance with the aim of the invention (by increasing the specific resistance and the wall-thickness), to combine the functions of the magnetizable or non-magnetizable bodies and that of the ventilator in one component only. This construction will function to increase loss according to the present invention, when, in case of a ventilator of any shape made of a non-magnetizable material, the specific resistance is higher than 0.08 ohm mm$^2$/m and, in case of a non-magnetizable material the average axial dimension of the solid body of the ventilator (indicated with c in figure), is more than 20 mm. When such components are used which will serve exclusively for ventilation, these parameters are not required.

In the rotor according to the invention as described the loss is greater, than the natural loss, accordingly, the starting torque will be also higher. This is illustrated in the following description of the operation, of the rotor so constructed, from rest.

In FIG. 1 the common stray flux lines of the short circuit ring 5 and the end turns 2 intersect the conductive medium 7 or the magnetizable medium 8 and induce an eddy current therein. As a consequence, in the conductive medium 7 or in the magnetizable medium 8 losses arise.

In FIG. 2, the stray flux lines of the short circuit ring and the stray flux lines of the end turns 2 intersect the disc 7 and induce an eddy current therein. Accordingly, in the disc 7 losses arise.

Figure 3:
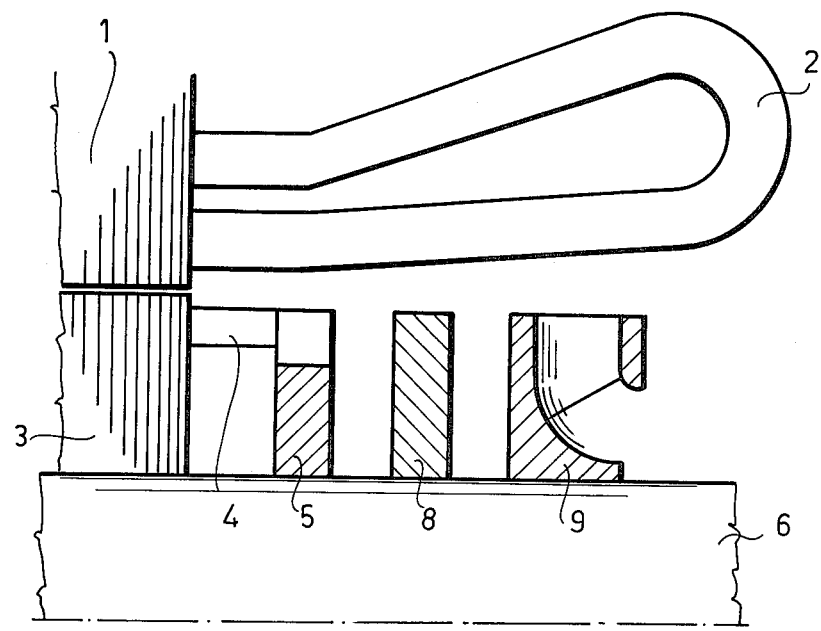
FIG. 3 is a view similar to FIG. 2 showing another arrangement of bodies on the shaft.

In FIG. 3 the iron disc 8 increases the stray flux, so that in the short circuit ring 5 the current displacement and the loss increase to a slight extent. A part of the stray flux of the end turns passes through the disc 8, whereby the stray flux is converted into a main flux. (The advantageous effect may be observed even in course of operation.) Since a considerable flux is passing through the iron disc 8, and as the disc 8 is made of a solid material, significant losses arise.

The embodiment according to FIG. 4 represents the combination of the embodiments illustrated in FIGS. 1 and 2. The iron disc 8 increases the stray flux passing through the conductive disc 7, accordingly, losses will increase also.

With the embodiments shown in FIGS. 5 and 6, the iron ring 13 ensures that the stray flux lines of the short circuit ring 5 and of the end turns could be closed towards the iron core of the rotor 3, i.e. via the ribs 10, or the supporting brackets 12 towards the shaft 6, respectively.

In FIG. 7, as a consequence of the deep notches, the stray flux lines of the short circuit ring are passing through the disc 7, 8 in a more advantageous direction, mainly through the middle of the disc. Accordingly the loss in the disc will be higher.

In FIG. 8 an embodiment is shown wherein the function of the disc 7 and/or 8, and that of the ventilator 9 are combined in a conveniently shaped component.

It will be obvious from the foregoing that the main advantage of a rotor according to the invention lies in that, in the most valuable part of the machine, (i.e. the active part thereof) a space which is normally free becomes suitable either for increasing the output of the machine and/or for reducing electromagnetic stresses. The solution according to the invention—when compared to the known solutions—is considerably simpler; it can be manufactured easier, and asynchronous machines will show a high grade of operational safety. The added losses serving to the increase of the starting torque arise in a space not previously utilized, under the end turns. As a consequence, the squirrel-cage system, sensitive to warming and thermal expansion, will be relieved of such stresses in course of starting. Compared with the machines employing double cages, the effort relating to the manufacturing of the bars, can be reduced by half, while simultaneously, the problems in connection with wedging and uneven warming, being characteristic for the machines with deep bars, are eliminated. The components 7 and 8 may be made of cheap materials. In addition to this, they may have a very simple geometry, e.g. they may be shaped as discs, and it goes without saying that soldering is superfluous. Accordingly, thermal loadibility may be higher, and due to their position, a better cooling may be obtained than in the conventional cage-systems. Thus motors having the same size loads and a higher moment of inertia can be started easier than before. Since the role of the parameters of the end turn field, of the resistances, and of the reactances is the greater, the pole number of the machine can be lowered. The advantages having been described will assert themselves most strongly in machines with a lower pole number, in particular with machines having only two poles.

What we claim:

1. An asynchronous electric machine comprising a rotor having a core mounted on a shaft, a plurality of uniformly spaced bars located in said core and extending axially outward at each end and a short circuiting ring connecting the bars at each end of the rotor, a stator having a core surrounding said rotor, and a plurality of coils passing through said core having end turns located at each end of the stator, axially outside said short circuiting ring, means for producing a high torque between said rotor and stator comprising at least one annular conductive body mounted about said shaft at at least one end of said rotor for conjoint rotation therewith, said annular conductive body lying spaced from and axially between said short circuiting ring and said end turns and radially between said coils and said shaft, said annular conductive body lying within the common stray magnetic field of the end turns and the short circuiting ring at the respective end of said rotor and being of sufficient size to produce considerable flux loss therein.

2. The machine according to claim 1 wherein said at least one annular conductive body is made of magnetizable material.

3. The machine according to claim 1 wherein said at least one annular conductive body is made of non-magnetizable material.

4. The machine according to claim 1 having a plurality of annular conductive bodies at at least one end of said rotor, at least one of said annular conductive bodies being made of magnetizable material and at least one being made of non-magnetizable material.

5. The machine according to claim 4 wherein at least one of said at least one annular conductive body is shaped as a ventilator.

6. The machine according to claim 5 wherein the body shaped as a ventilator is formed of non-magnetizable material having a specific resistance higher than 0.08 ohm mm$^2$/m.

7. The machine according to claim 5 wherein said body shaped as a ventilator has a portion in the form of an annular disc at least said disc portion being made of magnetizable material and having an axial dimension larger than 20 mm.

8. The machine according to claim 1 including a supporting bracket for said conductive annular body, said supporting bracket being made of magnetizable material and being interposed between said body and said shaft.

9. The machine according to claim 1 including a supporting bracket for said conductive annular body, said supporting bracket being made of magnetizable material and being interposed between said body and said iron core.

* * * * *